J. R. DAVIDSON.
ROPE GRIPPING DEVICE.
APPLICATION FILED JUNE 18, 1913.
1,117,801.
Patented Nov. 17, 1914.
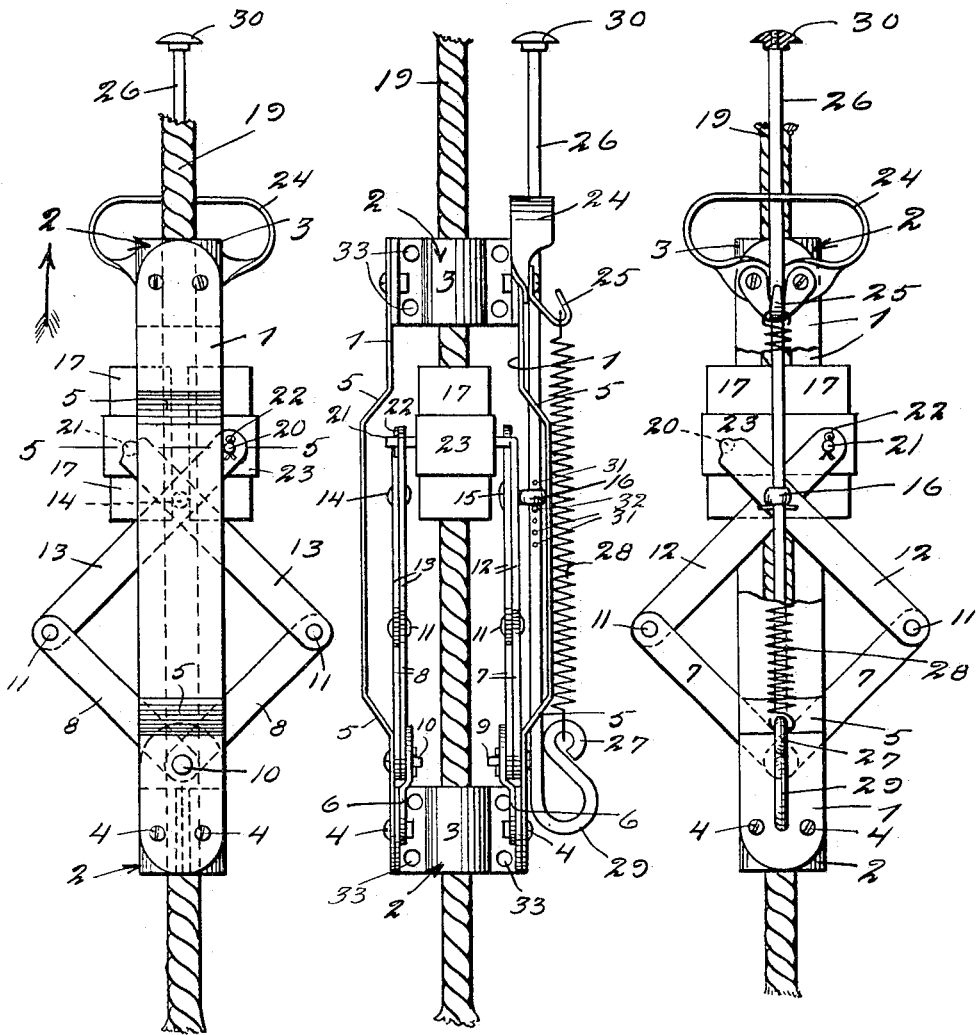
Fig. 1.  Fig. 2.  Fig. 3.
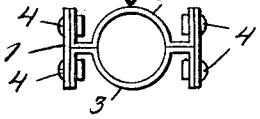
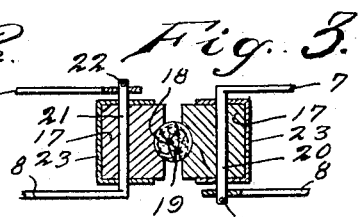
Fig. 4.  Fig. 5.
Witnesses
J. Milton Jester
C. Everett
Inventor
James R. Davidson
By H. A. Gourick
Attorney

UNITED STATES PATENT OFFICE.

JAMES R. DAVIDSON, OF MOUNT HOPE, WISCONSIN.

ROPE-GRIPPING DEVICE.

1,117,801. Specification of Letters Patent. Patented Nov. 17, 1914.

Application filed June 18, 1913. Serial No. 774,485.

*To all whom it may concern:*

Be it known that I, JAMES R. DAVIDSON, a citizen of the United States, residing at Mount Hope, in the county of Grant and State of Wisconsin, have invented certain new and useful Improvements in Rope-Gripping Devices, of which the following is a specification.

My invention relates to rope gripping devices and particularly to a rope gripping device which will engage a rope and maintain itself in position thereon and which will grip the rope more tightly in proportion to the amount of strain placed upon the grip.

The object of this invention is to provide a device of this character which is adapted to be used for a variety of purposes requiring a grip which will engage a rope automatically and which cannot be disengaged until all strain has been relieved from the device including the weight of the device itself.

An important object is to provide a device of this character comprising rope gripping members connected by links and provided with constant spring tension upon said links in such manner that the device will firmly grip a rope until the spring tension has been relieved.

Other objects and advantages such as simplicity, durability, efficiency, cheapness and the general improvement of the art will be carefully brought out in the following specification and illustrated in the accompanying drawings, in which:

Figure 1 is a front elevation of my improved rope gripping device, Fig. 2 is a side elevation of the same, Fig. 3 is a rear elevation, Fig. 4 is a detail view, Fig. 5 is a cross sectional view on the line 5—5 of Fig. 1.

Referring more particularly to the drawings, the numeral 1 designates side bars of my improved gripping device, which are connected at their ends by brackets 2 formed preferably of similar sections 3, bent, as shown, and secured upon the bars 1, as by bolts 4. The bars 1 are bent, as shown, forming angular portions 5. The lower brackets 2 have secured thereto brackets 6, which are disposed inwardly of the bars 1. Pairs of links 7 and 8 are pivoted, as at 9 and 10, between the bars 1 and brackets 6 and extend upwardly in an inclined direction for connection as at 11 with other pairs of links 12 and 13, as shown. The links 13 are pivotally connected to each other at 14 and the links 12 are pivoted on a rivet or bolt 15 which is provided at its outer end with an eye or loop 16 for a purpose to be described. The links 12 and 13 are pivotally connected at their upper ends with a pair of rope gripping members 17 which are formed preferably of wood and which are curved as at 18 upon their inner faces for engagement with a rope or cable 19. The links 12 and 13 may be connected with the members 17 by any suitable means such as bolts or transverse pins, but in order to strengthen the structure I preferably form a bolt 20 upon one of the links 13 and a bolt 21 upon one of the links 12. These bolts 20 and 21 pass through the members 17 and through openings formed in the free ends of the other links 12 and 13 and are prevented from being removed therefrom by means of cotter pins 22 or the like. In order to reinforce the members 17 I preferably provide them with bands 23 of metal which lessens the danger of splitting the members.

Detachably secured upon the upper end of one of the bars 1 by means of the bolts 4 are a handle 24 and a hook 25 for a purpose to be described. A rod 26 extends through the handle 24, under the hook 25 and through the angular portions 5 of one side bar 1, and is provided upon its lower end with a loop 27 to which is secured one end of a coil spring 28 which has its other end connected with the hook 25. The rod 26 is further provided with a loop 29 adapted to be engaged by the operator's fingers, and also a button 30 adapted to be engaged by the operator's hand. The rod 26 extends through the eye or loop 16 which pivots the links 12 as previously described, and is provided above and below the eye 16 with a plurality of openings 31 through any desired one of which may be inserted a pin 32.

The operation of the device is as follows: The rope or cable extends through the members 2 and between the blocks 17, as shown. The members 2 are provided with apertures 33 for receiving means for connecting with the gripping device any desired attachments in order to adapt the entire structure for use in any operation in which it is required that a device "crawl" or travel upon a rope or cable. The coil spring 28 being connected with the hook 25 and the loop 27 exerts an upward pressure upon the rod 26 which pressure is exerted upon the loop or eye 16 by means of the pin 32, thus causing the links 7 and 12, and 8 and 13 to be straightened relatively to each other which causes the upper ends of the links 12 and 13 to approach each other carrying the members 17 until the members 17 come in close contact with the rope or cable 19. From this it will be seen that when the device is in the position shown in Figs. 1, 2 and 3, and the members 17 are in engagement with a rope or cable 19 if any downward pressure is exerted upon the device the members 17 will grip the rope more securely. At the same time the entire device may be moved along the rope in the direction of the arrow as this movement tends to flatten the links 12 and 13 in relation to the links 7 and 8, thus releasing the pressure of the members 17 upon the rope. As long as the device is moved along the rope in the direction of the arrow the members 17 will not again grip the rope until the movement is stopped, whereupon the members 17 will immediately grip the rope as previously described. If it is desired to move the device in an opposite direction upon the rope it is necessary to either push upon the button 30 or pull upon the loop 29 in order to move the pin 32 out of engagement with the loop or eye 16, and also pull upon the handle 24 whereupon the members 17 will immediately release their grip upon the rope 19 allowing the device to be moved. The moment, however, that the operator ceases to pull upon the loop 29 or push upon the button 30, the pin 32 will be forced into engagement with the loop or eye 16 by means of the spring 28, thus causing the members 17 to grip the rope as previously described. In order to accommodate the device for gripping ropes of different diameters, the pin 32 may be placed in any selected one of the holes 31 formed in the rod 26.

Having thus described my invention what I claim is:

1. A rope gripping device comprising a frame, links connected with said frame, other links connected with said links and with each other, rope gripping members connected with said last named links, spring tension on said rope gripping members, and means for releasing said tension.

2. A rope gripping device comprising a frame, links connected with said frame, other links connected with said first named links and connected with each other, a pair of rope gripping members connected with said last named links, an eye bolt connected with said last named links, and a spring controlled push rod extending within said frame and provided with means to engage said eye bolt.

3. A rope gripping device comprising a frame, links connected with said frame, other links connected with said links and with each other, an eye bolt extending from one of said last named points of connection, rope gripping blocks connected with said last named links, and a spring pressed push rod slidable in said frame and provided with means for engaging said eye bolt.

4. A rope gripping device comprising a frame, links connected with said frame, other links connected with said first named links and connected with each other intermediate their ends, an eye bolt extending from one of said last named points of connection, a pair of rope gripping members connected with said last named links, a spring pressed push rod slidable in said frame, and means on said push rod adapted to engage said eye bolt.

5. A rope gripping device comprising a frame, pairs of links connected with said frame, other pairs of links connected at their ends with said first named links and connected with each other intermediate their ends, an eye bolt extending from one of said last named points of connection, a pair of rope gripping members connected with the free ends of said last named links, a push rod slidable in said frame, a spring connected with said push rod and said frame, and a projection on said push rod adapted to engage said eye bolt.

6. A rope gripping device comprising a frame, pairs of links connected with said frame, other pairs of links connected at their ends with said first named links and connected with each other intermediate their ends, an eye bolt extending from one of said last named points of connection, a pair of rope gripping members connected with the free ends of said last named links, a push rod slidable in said frame, a spring connected with said push rod and said frame, a finger engaging hook formed on said push rod, and a projection on said push rod adapted to engage said eye bolt.

7. A rope gripping device comprising a frame, pairs of links pivoted upon said frame, other pairs of links pivotally connected at their ends with said first named links and pivotally connected with each other intermediate their ends, a bolt connected with one of said last named points of connection and provided with an eye, a pair of rope gripping members pivotally connected with the free ends of said last named links, a push rod slidable within said frame and extending through the eye in said bolt, a spring connected with said push rod and said frame, and a projection on said push rod adapted to engage the lower side of said eye bolt.

8. A rope gripping device comprising an open frame, a pair of links pivotally connected with each side of said frame, another pair of links pivotally connected at their ends with the free ends of said first named links and pivotally connected with each other intermediate their ends, one of the pivots comprising an eye bolt, a pair of rope gripping members pivotally connected with the free ends of said last named links, a push rod extending through said eye bolt, a spring connected with said push rod and said frame and a projection on said push rod normally engaging the lower side of said eye bolt.

9. A rope gripping device comprising a frame, pairs of links connected with said frame, other pairs of links connected with said links and pivotally connected with each other intermediate their ends, rope gripping members connected with said last named links, spring tension on said gripping members, and means for releasing said tension, said frame being provided with apertures and said apertures being adapted for securing to said frame a platform or other attachments.

In testimony whereof I hereto affix my signature in the presence of two witnesses.

JAMES R. DAVIDSON.

Witnesses:
J. MILTON JESTER,
C. EVERETT.